US009574532B2

(12) United States Patent
Del Frate

(10) Patent No.: US 9,574,532 B2
(45) Date of Patent: Feb. 21, 2017

(54) VALVE ASSEMBLY AND INJECTION VALVE

(75) Inventor: Licia Del Frate, Lucca (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 163 days.

(21) Appl. No.: 14/343,892

(22) PCT Filed: Aug. 29, 2012

(86) PCT No.: PCT/EP2012/066769
§ 371 (c)(1),
(2), (4) Date: Jul. 8, 2014

(87) PCT Pub. No.: WO2013/034477
PCT Pub. Date: Mar. 14, 2013

(65) Prior Publication Data
US 2014/0339449 A1  Nov. 20, 2014

(30) Foreign Application Priority Data
Sep. 9, 2011 (EP) .................................. 11180803

(51) Int. Cl.
*F02M 63/00* (2006.01)
*F02M 51/06* (2006.01)
*F16K 41/10* (2006.01)

(52) U.S. Cl.
CPC ....... *F02M 51/0614* (2013.01); *F02M 51/061* (2013.01); *F02M 63/0057* (2013.01);
(Continued)

(58) Field of Classification Search
CPC ........... F02M 51/00–51/0696; F02M 63/0057; F02M 2200/16; F02M 2200/707; F02M 51/0614; F02M 51/061; F16K 41/10
(Continued)

(56) References Cited

U.S. PATENT DOCUMENTS 6,311,950 B1   11/2001  Kappel et al. ........... 251/129.06
6,364,221 B1 *  4/2002  Czimmek .......... F02M 51/0603
                                            239/5
(Continued)

FOREIGN PATENT DOCUMENTS

CN       1327507 A    12/2001  ............. F02M 51/06
DE     10260349 A1     7/2004  ............. F02M 51/06
(Continued)

OTHER PUBLICATIONS

European Search Report, Application No. 11180803.6, 5 pages, Feb. 24, 2012.
(Continued)

*Primary Examiner* — Darren W Gorman
*Assistant Examiner* — Juan C Barrera
(74) *Attorney, Agent, or Firm* — Slayden Grubert Beard PLLC

(57) ABSTRACT

A valve assembly for an injection valve may include a valve body including a central longitudinal axis, the valve body having a cavity with a fluid inlet portion and a fluid outlet portion, and a chamber, with an electro-magnetic actuator unit arranged in the chamber, and a valve needle axially movable in the cavity, the valve needle preventing a fluid flow through the fluid outlet portion in a closing position and releasing the fluid flow through the fluid outlet portion in further positions. The valve needle is designed to be actuated by the electro-magnetic actuator unit. A bellows arranged between the valve body and the valve needle is sealingly coupled to the valve body and to the valve needle. The bellows prevents a fluid flow between the cavity and the chamber. An injection valve comprising such a valve assembly is also disclosed.

7 Claims, 1 Drawing Sheet

(52) U.S. Cl.
CPC ......... *F16K 41/10* (2013.01); *F02M 2200/16* (2013.01); *F02M 2200/707* (2013.01)

(58) Field of Classification Search
USPC .......................................... 239/585.1–585.5
See application file for complete search history.

(56) References Cited

U.S. PATENT DOCUMENTS

| | | | |
|---|---|---|---|
| 6,685,105 B1 | 2/2004 | Ruehle et al. ............. | 239/102.1 |
| 7,044,407 B2 | 5/2006 | Fischer et al. ............. | 239/533.7 |
| 7,195,182 B2 * | 3/2007 | Fischer ................. | F02M 61/08 |
| | | | 239/533.1 |
| 7,309,032 B2 * | 12/2007 | Fischer ............. | F02M 51/0603 |
| | | | 239/102.1 |
| 7,669,783 B2 * | 3/2010 | Fischer ............. | F02M 51/0603 |
| | | | 239/102.2 |
| 7,886,993 B2 | 2/2011 | Bachmaier et al. ....... | 239/102.2 |
| 2004/0164175 A1 * | 8/2004 | Maeurer ............ | F02M 51/0603 |
| | | | 239/102.2 |
| 2009/0126692 A1 | 5/2009 | Bolz ............................ | 123/490 |

FOREIGN PATENT DOCUMENTS

| | | | |
|---|---|---|---|
| DE | 10353641 A1 | 6/2005 | ............. F02M 51/06 |
| EP | 1046809 A2 | 10/2000 | ............. F02M 51/06 |
| EP | 1431568 A2 | 6/2004 | ............. F02M 51/00 |
| EP | 1511932 B1 | 11/2006 | ............. F02M 51/06 |
| EP | 1731754 B1 | 3/2010 | ............. F02M 61/16 |
| WO | 02/36959 A2 | 5/2002 | ............. F02M 51/06 |
| WO | 2005/050001 A1 | 6/2005 | ............. F02M 51/06 |
| WO | 2013/034477 A1 | 3/2013 | ............. F02M 51/06 |

OTHER PUBLICATIONS

International Search Report, Application No. PCT/EP2012/066769, 9 pages, Oct. 16, 2012.
Chinese Office Action, Application No. 201280043764.8, 13 pages, Jul. 15, 2015.
Chinese Office Action, Application No. 201280043764.8, 9 pages, Aug. 9, 2016.

\* cited by examiner

VALVE ASSEMBLY AND INJECTION VALVE

CROSS-REFERENCE TO RELATED APPLICATIONS

This application is a U.S. National Stage Application of International Application No. PCT/EP2012/066769 filed Aug. 29, 2012, which designates the United States of America, and claims priority to EP Application No. 11180803.6 filed Sep. 9, 2011, the contents of which are hereby incorporated by reference in their entirety.

TECHNICAL FIELD

The invention relates to a valve assembly for an injection valve and an injection valve.

BACKGROUND

Injection valves are in wide spread use, in particular for internal combustion engines where they may be arranged in order to dose the fluid into an intake manifold of the internal combustion engine or directly into the combustion chamber of a cylinder of the internal combustion engine.

Injection valves for an internal combustion engine comprise actuator units. In order to inject fuel, the actuator unit is energized so that a fluid flow through the fluid outlet portion of the injection valve is enabled.

In order to enhance the combustion process in view of the creation of unwanted emissions, the respective injection valve may be suited to dose fluids under very high pressures. In the case of gasoline engines the pressures may be for example in the range of up to 200 bar. In the case of diesel engines the pressures may be in the range of more than 2,000 bar. The injection of fluids under such high pressures has to be carried out very precisely.

SUMMARY

One embodiment provides a valve assembly for an injection valve, comprising a valve body including a central longitudinal axis, the valve body having a cavity with a fluid inlet portion and a fluid outlet portion, and a chamber, with an electro-magnetic actuator unit being arranged in the chamber, and a valve needle axially movable in the cavity, the valve needle preventing a fluid flow through the fluid outlet portion in a closing position and releasing the fluid flow through the fluid outlet portion in further positions, wherein the valve needle is designed to be actuated by the electro-magnetic actuator unit, wherein a bellows is arranged between the valve body and the valve needle and is sealingly coupled to the valve body and to the valve needle and is designed to prevent a fluid flow between the cavity and the chamber.

In a further embodiment, the valve assembly includes a contact surface of the bellows with respect to the valve body, the contact surface being designed to sealingly couple the bellows to the valve body and having a circular shape with a diameter, and a sealing surface being arranged at an inner surface of the cavity, the sealing surface being designed to sealingly couple the valve needle and the valve body in a closing position of the valve needle and having a circular shape with an outer diameter, wherein the diameter of the contact surface is equal to the outer diameter of the sealing surface.

In a further embodiment, the electro-magnetic actuator unit comprising an armature axially movable in the chamber, wherein the armature comprises a permanent magnetic material.

In a further embodiment, the valve body comprises a ferromagnetic material.

Another embodiment provides an injection valve comprising a valve assembly with any of the features disclosed above.

BRIEF DESCRIPTION OF THE DRAWINGS

Example embodiments of the invention are explained below with reference to the drawings, in which.

DETAILED DESCRIPTION

Figure 1:
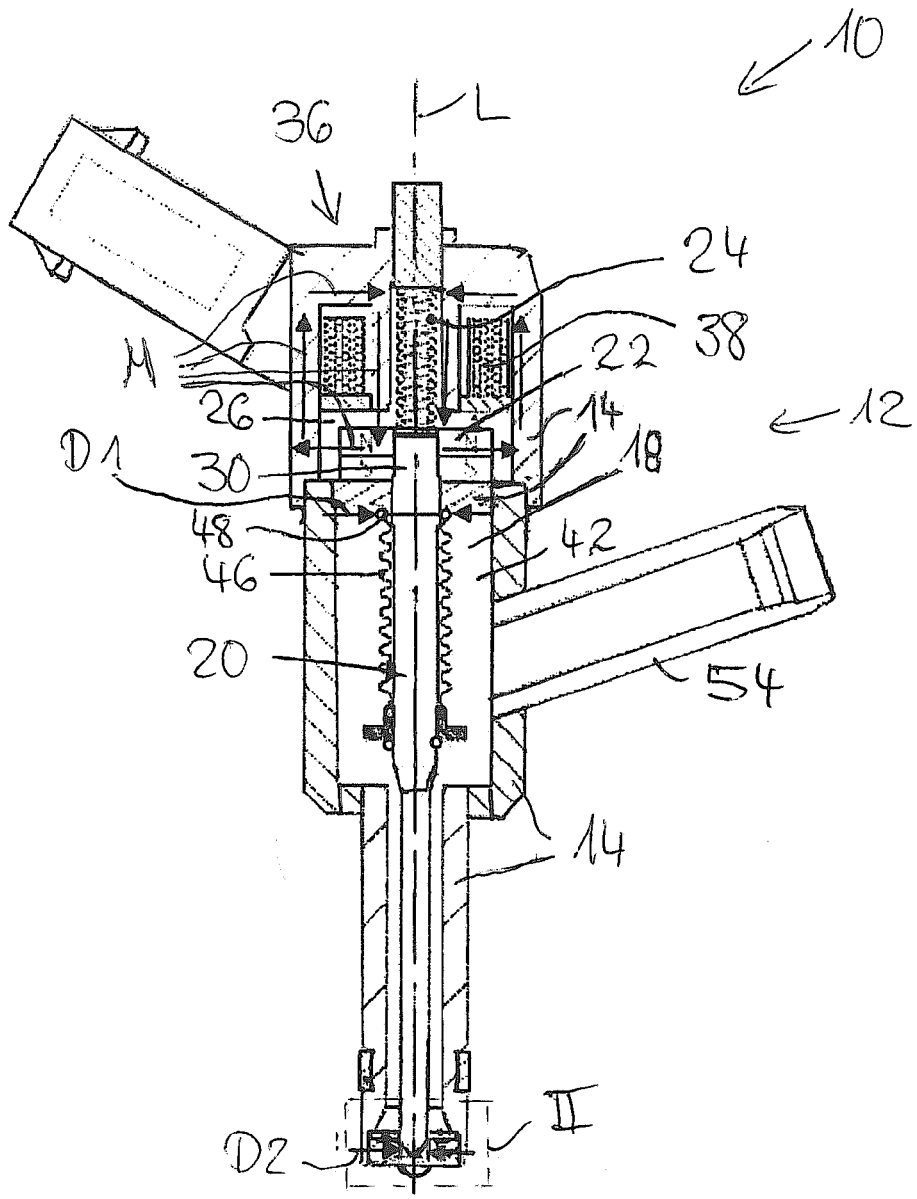
FIG. 1 shows an injection valve with a valve assembly in a longitudinal section view.

Some embodiments provide a valve assembly for an injection valve and an injection valve that are simply to be manufactured and which facilitate a reliable and precise function of the injection valve.

One embodiment provides a valve assembly for an injection valve, comprising a valve body including a central longitudinal axis, the valve body having a cavity with a fluid inlet portion and a fluid outlet portion, and a chamber, with an electro-magnetic actuator unit being arranged in the chamber, and a valve needle axially movable in the cavity, the valve needle preventing a fluid flow through the fluid outlet portion in a closing position and releasing the fluid flow through the fluid outlet portion in further positions. The valve needle is designed to be actuated by the electro-magnetic actuator unit. A bellows is arranged between the valve body and the valve needle and is sealingly coupled to the valve body and to the valve needle. The bellows is designed to prevent a fluid flow between the cavity and the chamber.

This has the advantage that the chamber in which the electro-magnetic actuator unit is arranged can be kept free from the fluid. Consequently, sticking effects inside the electro-magnetic actuator unit may be avoided. By this, the closing and/or the opening process of the valve needle may proceed very fast. Furthermore, as the chamber can be kept free from the fluid, the electro-magnetic actuator unit may have a high stability and a long life-time.

In one embodiment the valve assembly has a contact surface of the bellows with respect to the valve body. The contact surface is designed to sealingly couple the bellows to the valve body and has a circular shape with a diameter. A sealing surface is arranged at an inner surface of the cavity of the valve body. The sealing surface is designed to sealingly couple the valve needle and the valve body in a closing position of the valve needle and has a circular shape with an outer diameter. The diameter of the contact surface is equal to the outer diameter of the sealing surface. This has the advantage that the valve needle may be in a hydraulic equilibrium. Consequently, the force which is needed to open the valve needle may be independent from the pressure of the fluid during the operation of the valve assembly.

In a further embodiment the electro-magnetic actuator unit comprises an armature axially movable in the chamber. The armature comprises a permanent magnetic material. By this, a very exact control of the opening and closing process of the valve needle by the electro-magnetic actuator unit may be obtained. In particular, the movement of the armature and, consequently, the opening and closing of the valve needle may be carried out by changing the direction of the current through the electro-magnetic actuator unit. Consequently, a low energy consumption for the operation of the electro-magnetic actuator unit may be obtained. Furthermore, the chamber in which the armature is arranged may be kept free from the fluid due to the bellows. Therefore, the magnetic characteristics of the permanent magnetic armature may be kept independent from physical and chemical characteristics of the fluid.

In a further embodiment the valve body comprises a ferromagnetic material. By this, a bouncing of the valve needle during the closing of the injection valve may be avoided. Therefore, a very good control of the opening and closing performance of the injection valve is possible.

According to a second aspect the invention is distinguished by an injection valve comprising the valve assembly in accordance with the first aspect of the invention.

FIG. 1 shows an injection valve 10 that is used as a fuel injection valve for an internal combustion engine. The injection valve 10 that is in particular suitable for dosing fuel to the internal combustion engine comprises in particular a valve assembly 12.

The valve assembly 12 comprises a valve body 14 with a central longitudinal axis L. A cavity 18 is arranged in the valve body 14. The cavity 18 takes in a valve needle 20.

An armature 22 and a spring 24 are arranged in a chamber 26 which is shaped in the valve body 14. The armature 22 is axially movable in the chamber 26. The armature 22 is fixedly coupled to an end section 30 of the valve needle 20. The spring 24 is mechanically coupled to the valve needle 20. The spring 24 exerts a force on the valve needle 20 towards an injection nozzle 34 of the injection valve 10.

In a closing position of the valve needle 20 it sealingly rests on a seat plate 32 by this preventing a fluid flow through the at least one injection nozzle 34. The injection nozzle 34 may be, for example, an injection hole. However, it may also be of some other type suitable for dosing fluid.

The valve assembly 12 is provided with an electro-magnetic actuator unit 36 which comprises the armature 22 and a coil 38. The coil 38 is arranged in the chamber 26. The valve body 14 and the armature 22 are forming a magnetic circuit M of the electro-magnetic actuator unit 36 (FIG. 1).

The cavity 18 comprises a fluid outlet portion 40 and a fluid inlet portion 42. The fluid outlet portion 40 is arranged near the seat plate 32. The fluid outlet portion 40 is hydraulically coupled to the fluid inlet portion 42.

The shown injection valve 10 is of an inward opening type. In an alternative embodiment the injection valve 10 may be of an outward opening type.

A bellows 46 is arranged in the cavity 18. The bellows 46 is arranged between the valve needle 20 and the valve body 14. In the shown embodiment the bellows 46 is arranged coaxially with the valve needle 20. The bellows 46 has a contact surface 48 which is in contact with the valve body 14. The contact surface 48 is designed to sealingly coupling the bellows 46 to the valve body 14. In the shown embodiment the contact surface 48 has a circular shape with a diameter D1 (FIG. 1). Furthermore, the bellows 46 is sealingly coupled to the valve needle 20. As the bellows 46 is sealingly coupled to the valve body 14 and to the valve needle 20 a fluid flow between the cavity 18 and the chamber 26 may be prevented. Furthermore, the bellows 46 is formed and arranged in a manner that the valve needle 20 is actuable by the actuator unit 36 via the armature 22.

Figure 2:
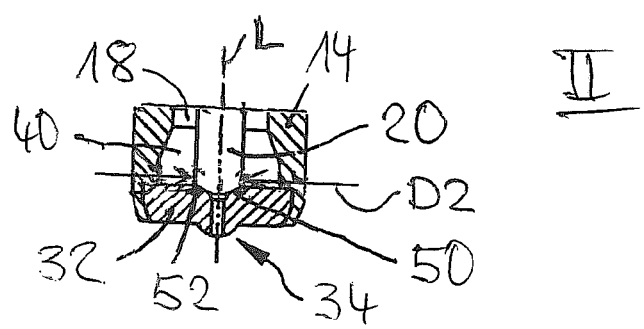
FIG. 2 is a detail of the valve assembly according to FIG. 1 in a longitudinal section view.

As can be seen in FIG. 2 the cavity 18 has an inner surface 50 with a sealing surface 52. The sealing surface 52 is designed to sealingly couple the valve needle 20 and the valve body 14 in a closing position of the valve needle 20. The sealing surface 52 has a circular shape with an outer diameter D2. Preferably, the diameter D1 of the contact surface 48 is equal to the outer diameter D2 of the sealing surface 52.

In the following, the function of the injection valve 10 will be described in detail:

The fuel is led from an inlet tube 54 to the fluid inlet portion 42 in the valve body 14 and then towards the fluid outlet portion 40.

The valve needle 20 prevents a fluid flow through the fluid outlet portion 40 in the valve body 14 in a closing position of the valve needle 20. Outside of the closing position of the valve needle 20, the valve needle 20 enables the fluid flow through the injection nozzle 34.

In the case when the electro-magnetic actuator unit 36 with the coil 38 gets energized the coil 38 may effect an electro-magnetic force on the armature 22. The following description of the function of the injection valve 10 is related to the armature 22 which comprises a material, which is permanent magnetic.

If a current is applied in a first direction through the coil 38 the permanent magnetic armature 22 may be attracted by the coil 38 and moves in axial direction away from the fluid outlet portion 40. The armature 22 takes the valve needle 20 with it. Due to the elasticity of the bellows 46 the valve needle 20 is able to move in axial direction out of the closing position. Outside of the closing position of the valve needle 20 a gap between the valve body 14 and the valve needle 20 at the axial end of the injection valve 10 facing away from of the actuator unit 36 forms a fluid path and fluid can pass through the injection nozzle 34.

In the case that a current is applied in a second direction through the coil 38 opposite to the first direction the permanent magnetic armature 22 may be repulsed by the coil 38. The armature 22 and the spring 24 may force the valve needle 20 to move in axial direction in its closing position. It is depending on the force balance between the force on the valve needle 20 caused by the actuator unit 36 and the force on the valve needle 20 caused by the spring 24 whether the valve needle 20 is in its closing position or not.

The bellows 46 has the advantage that the chamber 26 wherein the electro-magnetic actuator unit 36 is arranged may be hydraulically separated from the cavity 18 of the valve body 14. Consequently, the chamber 26 may be kept free from fluid. Therefore, the armature 22 which is arranged in the chamber 26 may be free of contact with the fluid. Therefore, a sticking effect between the armature 22 and the coil 38 may be avoided. Consequently, the closing process of the valve needle 20 may be carried out very fast. Furthermore, as the chamber 26 is free of fluid, the armature 22 may be carried out as a permanent magnet. The armature 22 being carried out as a permanent magnet allows a very good control of the opening and closing process of the injection valve 10. In particular, the current through the coil 38 may be inverted to carry out the respective opening and closing processes. This makes it possible that the energy required to operate the injection valve 10 may be kept small.

In particular, if the diameter D1 of the contact surface 48 is equal to the outer diameter D2 of the sealing surface, the valve needle 20 may be hydraulically balanced. Due to the hydraulic balancing, the force needed to bring the valve needle 20 into a position wherein a fluid flow through the fluid outlet portion 40 is released is independent from the operation pressure of the injection valve 10.

If the valve body 14 comprises a material which has ferromagnetic properties, the armature 22 comprising a permanent magnetic material may be attracted by the valve body 14 in a manner that a bouncing of the valve needle 20 during the closing of the injection valve 10 may be avoided. By this a good control of the movement of the valve needle 20 may be obtained and consequently, the energy required to operate the injection valve 10 may be kept small.

The invention is not limited to specific embodiments by the description on the basis of said exemplary embodiments but comprises any combination of elements of different embodiments. Moreover, the invention comprises any combination of claims and any combination of features disclosed by the claims.

What is claimed is:

1. A valve assembly for an injection valve, comprising:
   a valve body including a central longitudinal axis, the valve body including:
   a cavity with a fluid inlet portion and a fluid outlet portion, and
   a chamber in which an electro-magnetic actuator unit is arranged, and
   a valve needle axially movable in the cavity, the valve needle preventing a fluid flow through the fluid outlet portion in a closing position of the valve needle, and releasing the fluid flow through the fluid outlet portion in further positions of the valve needle,
   an armature disposed in the chamber coupled to the valve needle,
   wherein the armature comprises a permanent magnetic material driven along the central longitudinal axis by energizing the electro-magnetic actuator unit,
   wherein the valve needle moves along the central longitudinal axis along with the armature, and
   a bellows surrounding at least a portion of the valve needle extending into the cavity and sealingly coupled to the valve body and to the valve needle, the bellows being configured to prevent a fluid flow between the cavity and the chamber.

2. The valve assembly of claim 1, wherein:
   the bellows has a contact surface configured to sealingly couple the bellows to the valve body and having a circular shape with a diameter, and
   an inner surface of the valve body cavity defines a sealing surface configured to sealingly couple the valve needle and the valve body in a closing position of the valve needle and having a circular shape with an outer diameter, wherein the diameter of the contact surface is equal to the outer diameter of the sealing surface.

3. The valve assembly of claim 1, wherein the valve body comprises a ferromagnetic material.

4. An injection valve, comprising:
   a valve assembly comprising:
   a valve body including a central longitudinal axis, the valve body including:
   a cavity with a fluid inlet portion and a fluid outlet portion, and
   a chamber in which an electro-magnetic actuator unit is arranged, and
   a valve needle axially movable in the cavity, the valve needle preventing a fluid flow through the fluid outlet portion in a closing position of the valve needle, and releasing the fluid flow through the fluid outlet portion in further positions of the valve needle,
   an armature disposed in the chamber coupled to the valve needle,
   wherein the armature comprises a permanent magnetic material driven along the central longitudinal axis by energizing the electro-magnetic actuator unit,
   wherein the valve needle moves along the central longitudinal axis along with the armature,
   a bellows surrounding at least a portion of the valve needle extending into the cavity and sealingly coupled to the valve body and to the valve needle, the bellows being configured to prevent a fluid flow between the cavity and the chamber.

5. The injection valve of claim 4, wherein:
   the bellows of the valve assembly has a contact surface configured to sealingly couple the bellows to the valve body and having a circular shape with a diameter, and
   an inner surface of the valve body cavity defines a sealing surface configured to sealingly couple the valve needle and the valve body in a closing position of the valve needle and having a circular shape with an outer diameter, wherein the diameter of the contact surface is equal to the outer diameter of the sealing surface.

6. The injection valve of claim 4, wherein the valve body comprises a ferromagnetic material.

7. A valve assembly for an injection valve, comprising:
   a valve body with a central longitudinal axis, the valve body including a cavity with a fluid inlet portion and a fluid outlet portion, and a chamber in which an electro-magnetic actuator unit is arranged;
   a valve needle axially movable in the cavity, the valve needle preventing a fluid flow through the fluid outlet portion in a closing position of the valve needle, and releasing the fluid flow through the fluid outlet portion in further positions of the valve needle,
   an armature disposed in the chamber coupled to the valve needle,
   wherein the armature comprises a permanent magnetic material driven along the central longitudinal axis by energizing the electro-magnetic actuator unit,
   wherein the valve needle moves along the central longitudinal axis along with the armature,
   a bellows arranged between the valve body and the valve needle and sealingly coupled to the valve body and to the valve needle, the bellows being configured to prevent a fluid flow between the cavity and the chamber.

* * * * *